(12) United States Patent
Melara (10) Patent No.: US 8,393,053 B2
(45) Date of Patent: Mar. 12, 2013

(54) SELF-ORIENTING CASTER FOR FURNITURE

(75) Inventor: Francescantonio Melara, Bologna (IT)

(73) Assignee: Emilsider Meccanica S.p.A., Cadriano di Granarolo Dell'Emilia (IT)

( * ) Notice: Subject to any disclaimer, the term of this patent is extended or adjusted under 35 U.S.C. 154(b) by 786 days.

(21) Appl. No.: 12/310,330

(22) PCT Filed: Sep. 11, 2007

(86) PCT No.: PCT/EP2007/059532
§ 371 (c)(1),
(2), (4) Date: Feb. 20, 2009

(87) PCT Pub. No.: WO2008/034741
PCT Pub. Date: Mar. 27, 2008

(65) Prior Publication Data
US 2009/0193621 A1    Aug. 6, 2009

(30) Foreign Application Priority Data
Sep. 18, 2006  (IT) .............................. BO2006A0638

(51) Int. Cl.
*B60B 33/00* (2006.01)
(52) U.S. Cl. .................... 16/35 R; 16/29; 16/40; 16/91; 188/1.12
(58) Field of Classification Search ............ 16/29, 35 R, 16/40, 42 T, 43, 45, 46, 91; 280/86.751, 280/86.756; 301/5.301, 5.305, 5.309, 5.7, 301/64.307, 64.706, 95.11, 110, 132, 135; 188/1.12
See application file for complete search history.

(56) References Cited

U.S. PATENT DOCUMENTS

| | | | | |
|---|---|---|---|---|
| 978,161 A | | 12/1910 | Holmes | |
| 1,623,554 A | * | 4/1927 | Remde | 280/124.126 |
| 2,992,449 A | * | 7/1961 | Haydock | 16/43 |
| 4,377,883 A | * | 3/1983 | Folson | 16/47 |
| 4,649,595 A | * | 3/1987 | Shane | 16/18 CG |
| 5,237,721 A | * | 8/1993 | Andrisin, III | 16/20 |
| 5,357,868 A | * | 10/1994 | Maas | 105/180 |
| 6,748,623 B1 | * | 6/2004 | Tsai | 16/47 |
| 6,834,746 B1 | * | 12/2004 | Lin | 188/1.12 |
| 2005/0115021 A1 | | 6/2005 | Tsai | |

FOREIGN PATENT DOCUMENTS

| EP | 1 800 899 A | 6/2007 |
|---|---|---|
| GB | 967 915 A | 8/1964 |

* cited by examiner

*Primary Examiner* — Roberta Delisle
(74) *Attorney, Agent, or Firm* — Modiano & Associati; Albert Josif; Daniel J. O'Byrne (57) ABSTRACT

A self-orienting caster for pieces of furniture and the like, comprising at least one wheel which is supported so that it can rotate about a horizontal axis by a supporting structure which has a vertical cylindrical recess which is open upward and is axially offset with respect to said horizontal axis and constitutes said seat in which a pivot for the pivoting of the caster can rotate, the pivot being insertable in a receptacle of the piece of furniture onto which the caster is to be fitted, the supporting structure comprising two mutually opposite annular flanges, which form respective circular and coaxial holes, a tubular body whose opposite ends are rigidly coupled to the inner edges of the holes and form externally, between the flanges, a rolling track for a supporting bearing for the wheel, respective extensions being monolithically rigidly coupled to the flanges and being mutually associable so as to form the seat which is designed to receive the pivot for the pivoting of the wheel.

23 Claims, 11 Drawing Sheets

SELF-ORIENTING CASTER FOR FURNITURE

The present invention relates to a self-orienting caster for furniture and the like.

BACKGROUND OF THE INVENTION

Self-orienting casters constituted by a single wheel or by a pair of wheels which are mounted so that they can rotate on a horizontal shaft are known.

A vertical cylindrical recess is provided in the supporting structure, is open upward, is axially offset with respect to the shaft, and acts as a rotation seat for a vertical pivot for the self-orientation (pivoting) of the wheel, which is designed to be inserted and retained in a receptacle of the piece of furniture to which the wheel is to be fitted.

Self-orienting casters are also known in which the wheels can rotate on a tubular shaft which protrudes from opposite sides of the central supporting structure. Casters of this type, also known as hubless casters, are disclosed in U.S. Pat. No. 978,161, in US publication no. 2002/01758539 and in GB-967,915, in German publication no. 101 28 099, and in Italian utility model no. 238,060. CH-477,999, GB-967,915 and US publication no. 2002/1178539 disclose solutions in which the wheels and the tubular shaft have mutually opposite tracks for the rolling of balls or rollers for rotary support of the wheels.

In known casters of the so-called twin type, i.e., casters comprising two wheels mounted at the opposite ends of a single shaft which is supported at the center, the shaft supporting structure is symmetrical with respect to the central plane of the caster and load stresses are equally divided between the two wheels. This symmetry, taking into account the fact that the supporting structure of the casters is provided by molding plastic material, ensures considerable advantages, both because it facilitates the manufacture of simpler molds and stronger casters and because it allows to obtain products which are aesthetically appreciable for being fitted to items of furniture (chairs, tables, et cetera). This applies in particular to the case of so-called hubless casters.

However, the structure of the support of hubless casters is not suitable when the caster comprises a single wheel. In this case, the supporting structure assumes an asymmetric configuration, which when stressed undergoes deformations and causes problems in functionality and ease of rolling, in addition to the fact that the assembly of the wheel is rather laborious.

SUMMARY OF THE INVENTION

The aim of the present invention is to provide a self-orienting caster of the type which comprises a single wheel which can rotate on a tubular shaft (so-called hubless caster) which is provided with a structure which is capable of ensuring constructive stability and high reliability in operation.

Within this aim, an object of the present invention is to provide a wheel which can be provided with a braking device which can be neutralized if needed.

This aim and this and other objects that will become better apparent hereinafter are achieved with a self-orienting caster for pieces of furniture and the like whose characteristics are defined in the appended claims.

BRIEF DESCRIPTION OF THE DRAWINGS

Further characteristics and advantages of the invention will become better apparent from the following detailed description of some preferred embodiments of the caster according to the invention, illustrated by way of non-limiting example in the accompanying drawings, wherein.

DESCRIPTION OF THE PREFERRED EMBODIMENTS

With reference to FIGS. 1 to 6, the reference numeral 1 designates a self-orienting caster which is composed of a single wheel 2 and a structure 3 for supporting the caster and for fitting it to a piece of furniture. The wheel 2 and the supporting structure 3 are provided by molding plastic material which has specific qualities in order to ensure that the requirements of mechanical strength, aesthetics, and low cost of the finished product are met.

The wheel 2 comprises a cylindrical inner ring 4 (FIG. 6) made of plastic material, which is covered externally by a covering 5 made of softer plastic material, which is adapted to soften the rolling noise of the caster and to preserve the integrity of the surfaces over which the wheel will have to run, such as for example wood, linoleum, and so forth. The internal surface of the ring 4 forms a rolling track 6 for the rolling elements of a bearing 7, by means of which the ring 4 is supported rotatably on the supporting structure 3, as will become better apparent hereinafter.

The supporting structure is constituted by two elements 8 and 9 (FIGS. 4, 5) which are shaped so that they can be mutually associated to provide the lateral covering of the wheel 2 and form a seat for the engagement of a pivot (not shown) by means of which the caster is applied so that it can rotate to a piece of furniture.

The element 8 (FIGS. 4, 6) comprises a flange 10, which has a circular hole 11 from the rim of which a tubular portion 12 protrudes which is perpendicular to the flange 10 and has an outer cylindrical surface 13 which constitutes a rolling track which lies opposite the track 6 for the rolling elements 14 of the bearing 7. The rolling elements 14 are constituted by cylindrical rollers, which are accommodated in respective seats of an annular cage 15 which are open inward and outward so as to allow the rollers to roll on the tracks 6 and 13. An annular ridge 16 protrudes axially from the flange 10 and around the portion 12 and when the assembly of the caster is completed acts as a lateral support for the bearing 7.

Further, a wing 17 protrudes from the flange 10 and forms a sort of half-cylinder 18 (FIGS. 3, 5) which surrounds a bush 19 which forms a recess that constitutes a seat 19a which is designed to receive the pivot for the pivoting of the wheel. The rim of the bush 19 is constituted by a collar 20, in which two rectangular openings 21 are provided in diametrically opposite positions (see enlarged view of FIG. 4). A pin 22 is provided from the wing 17 and below the bush 19 (see enlarged-scale view of FIG. 5) and is coaxial to the tubular portion 12, while in the element 8 there is a groove 23 which surrounds at the ends the tubular portion 12. As will become better apparent hereinafter, the openings 21, the pin 22 and the groove 23 are part of the means which allow the mutual positioning and mating of the elements 8 and 9 during assembly.

The element 9 has a structure which is mirror-symmetrically similar to the element 8. It in fact comprises (FIGS. 4, 5, 6) a flange 24 from which a wing 25 protrudes which forms a half-cylinder 26 which externally has a shape which is mirror-symmetrical with respect to the half-cylinder 18 and forms internally a cavity 27 which is complementary with respect to the bush 19. On the rim of the cavity 27 there are two teeth 28 (see enlarged-scale view of FIG. 4) which are diametrically opposite and are beveled on one side so as to be able to engage in the openings 21 during the assembly of the wheel.

Below the cavity 27 there is a blind hole 29 (see enlarged-scale view of FIG. 4), whose dimensions are such as to allow the interlocking engagement of the pivot 22 and help, with the teeth 28, to keep the half-cylinders 18 and 26 joined. The flange 9 surrounds a hole 30, which is formed by a rim 31 whose diameter is such that it can engage by forcing in the groove 23 of the tubular portion 12 and provide a firm connection of the flanges 10, 24. The element 9 is completed by an annular ridge 32, which protrudes inward from the flange 24 and acts as a lateral support for the bearing 7, which accordingly remains locked axially on the tubular portion 12 between the ridges 16 and 32.

From what has been described above, it can be deduced easily that the assembly of the described caster can be performed without the aid of special equipment but simply by mating the two elements 8, 9 after positioning the bearing 7 and the wheel 2 on the tubular portion 12. The interlocking of the rim 31 in the groove 23, together with the engagement of the pivot 22 in the hole 29 and of the teeth 28 in the openings 21, in fact provides a closed supporting structure which is capable of bearing even intense load stresses during the steps for the pivoting of the caster.

The described caster is susceptible of numerous modifications and variations within the scope of the appended claims.

FIGS. 7-19 illustrate four variations in which, for reasons of brevity in description, identical or equivalent elements or parts of the preceding FIGS. 1-6 are designated by the same reference numerals.

FIGS. 7-15 illustrate a second embodiment of a caster provided with a braking system which ensures locking of the caster. Substantially, the variation comprises a lever 33 (FIGS. 13-15) which has a flattened S-shape and has a knurling 34 on the actuation side. The lever 33 is composed of two parts 35, 36, which are mutually mirror-symmetrical with respect to a central plane and are provided respectively with a pair of pins 37 adapted to engage by interlocking in respective holes 38 of the other part 36.

Respective triangular fins are rigidly coupled to the outer edge of the part 35 and 36 and constitute the articulation arms 39, 40 of the lever 33. Holes 41, 42 are provided at the ends of the arms 39, 40, and by means of said holes the lever 33 is articulated about pins 43, 44 which protrude outward from the flanges 10, 24 (see enlarged-scale view of FIG. 11). Cams 45, 46 are provided on the internal faces of the arms 39, 40 (FIGS. 12, 14, 15) and have a circular shape which is concentric with respect to the respective holes 41, 42.

The cams 45, 46 are constituted by circular protrusions which are concentric with respect to the holes 41, 42 and are mirror-symmetrically mutually opposite. In practice, the cams form ramps of increasing height starting from respective pins 47, 48 which act as elements for stopping the oscillations of the lever 33.

Figure 11:
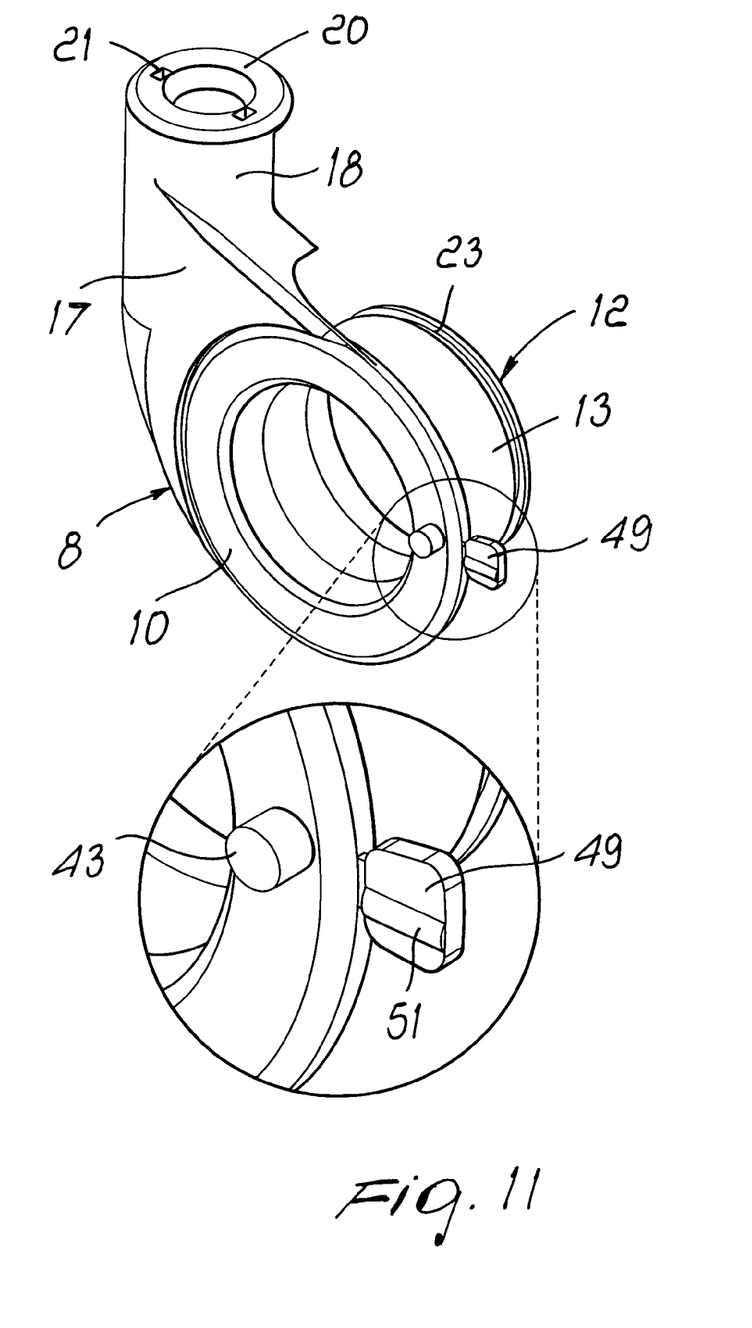
FIG. 11 is a partial perspective view and an enlarged-scale detail view of the caster of FIG. 7.
Figures 13, 14:
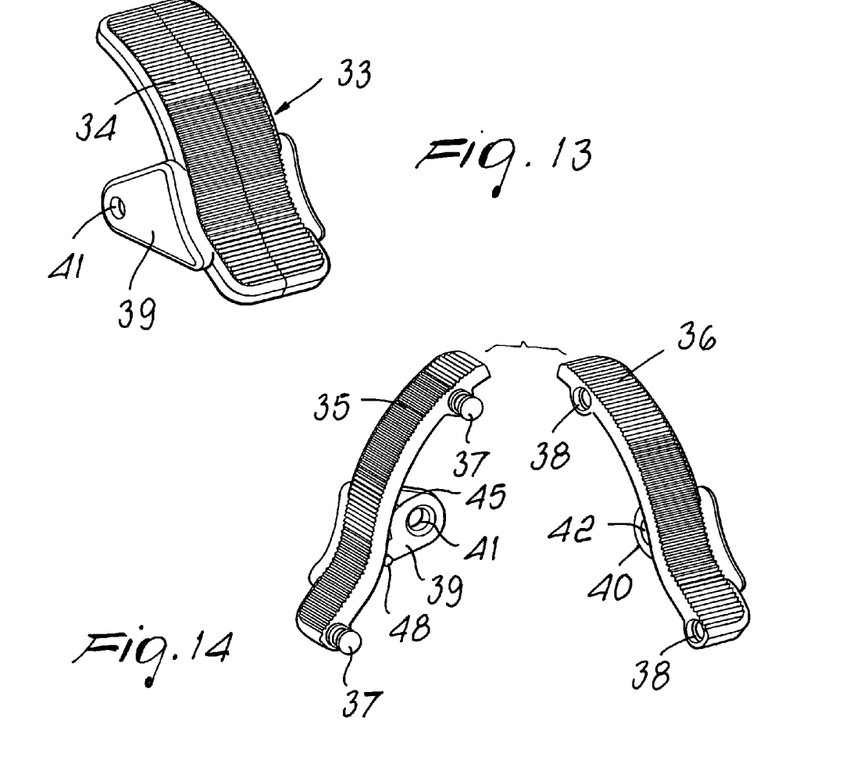
FIG. 13 is a perspective view of the actuation lever of the brake of the caster of FIG. 7.
FIG. 14 is an exploded view of the lever of FIG. 13.
Figure 15:
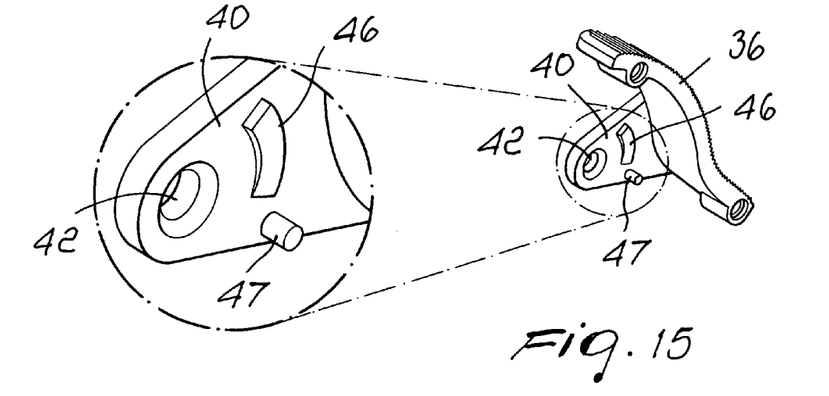
FIG. 15 is a perspective view of a part and of an enlarged-scale detail of the lever of FIG. 13.

The cams 45, 46 are designed to act on respective pads 49, 50, which consist of fins which protrude radially out from the flanges 10, 24 and are attached flexibly to the rim of said flanges (see enlarged-scale view of FIG. 11).

The sliding blocks 49, 50 are arranged mutually opposite the sides of the wheel 2 and have, on the outer side, a radial rib 51 (see in particular FIG. 11) which allows to interact with the cams 45, 46.

From what has been described, it is evident that by actuating the lever 33 downward the cams 45, 46 act on the ribs 51 of the pads 49, 50, which by flexing inward clamp against the sides of the wheel 2, locking it. Of course, the release of the wheel 2 occurs by moving the lever upward so as to allow the cams 45, 46 to disengage from the ribs 51 and thus allow the pads 49, 50 to move away from the sides of the wheel 12 so as to free its rotation.

Figure 16:
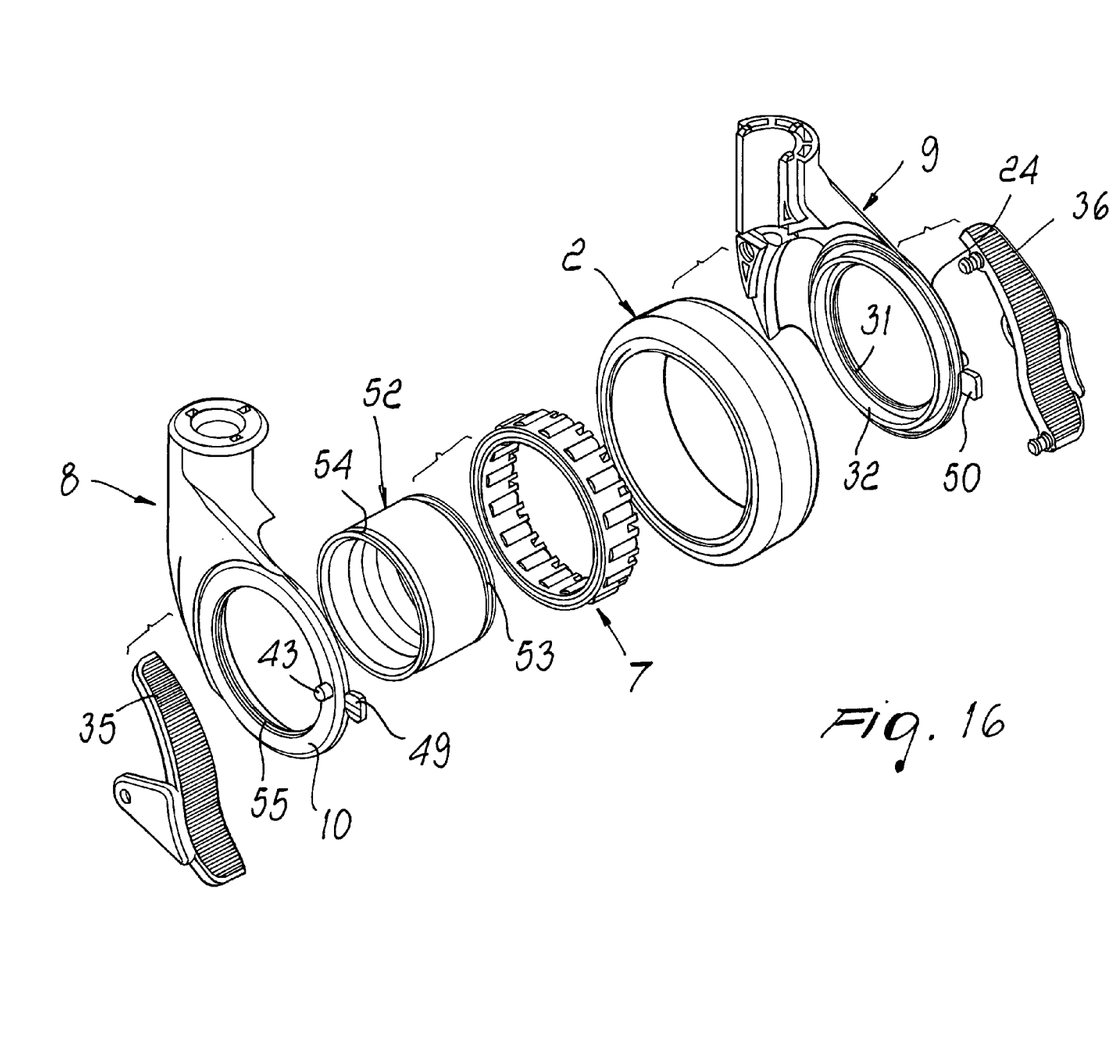
FIG. 16 is an exploded perspective view of a third embodiment.

In a third embodiment of the invention, shown in FIG. 16, the tubular portion 12 is not rigidly coupled to the flange 10, but forms a sleeve 52 which is provided, at the opposite ends, with grooves 53, 54; the rim 31 of the flange 24 of the element 9 engages in the groove 53 and the rim 55 formed in the flange 10 of the element 8 engages in the groove 54, ensuring its axial positioning.

Figures 1, 2, 3:
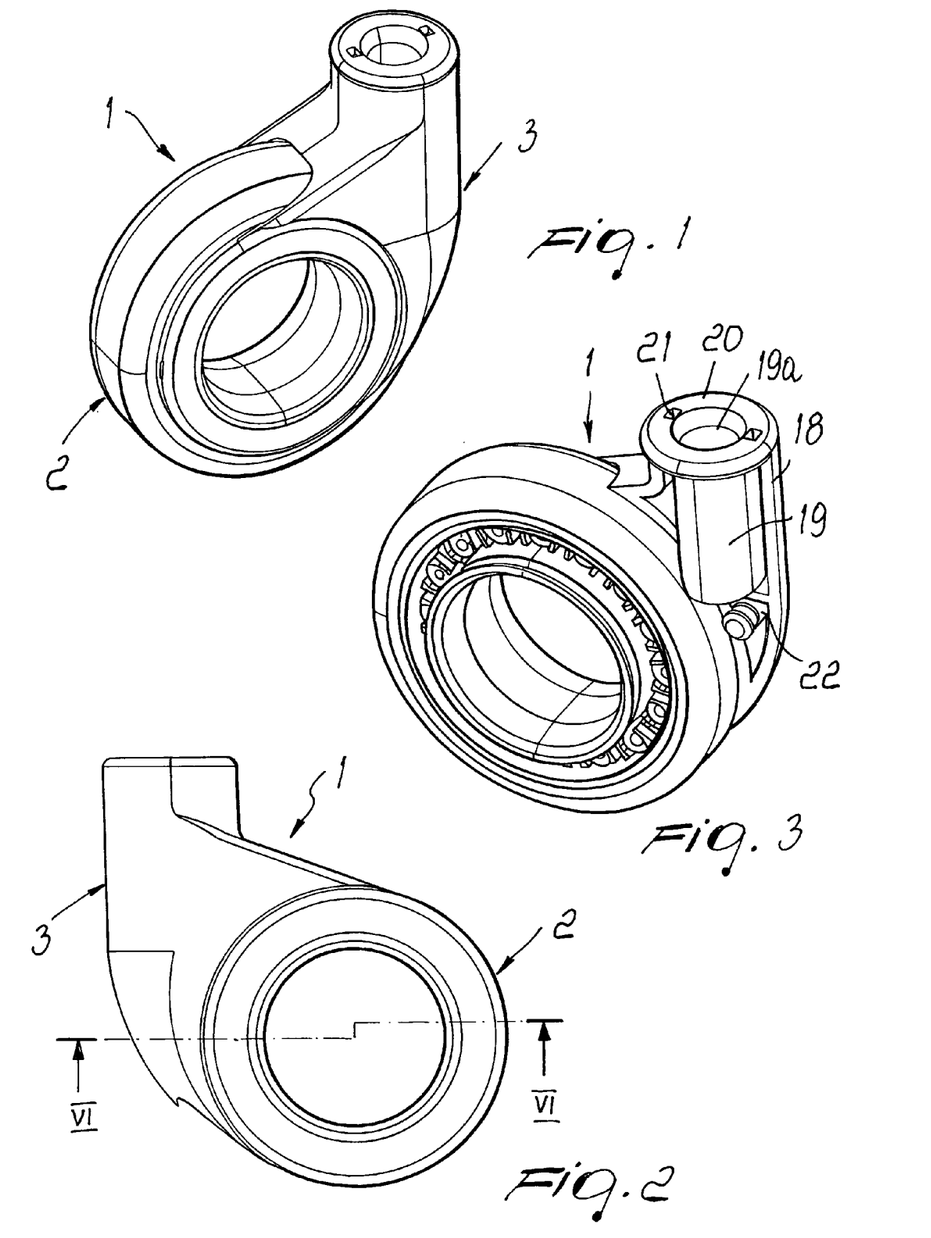
FIG. 1 is a perspective view of a self-orienting twin caster according to a first exemplary embodiment of the invention.
FIG. 2 is a side elevation view of the caster of FIG. 1.
FIG. 3 is a view of the caster of FIG. 1 after the removal of a lateral covering.
Figure 4:
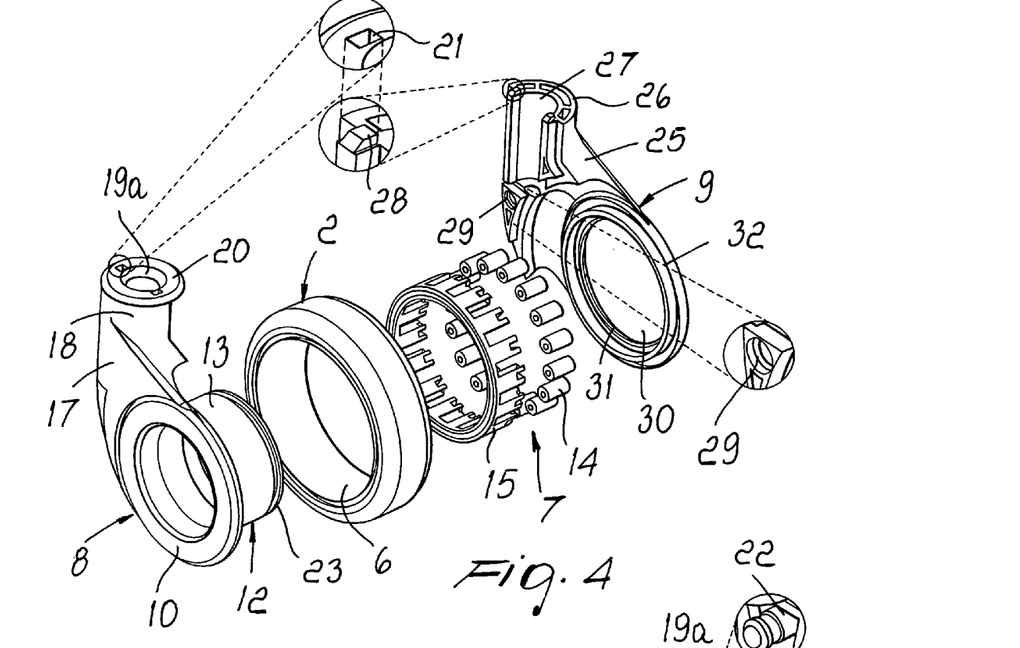
FIG. 4 is an exploded perspective view of the caster of FIG. 1.
Figure 5:
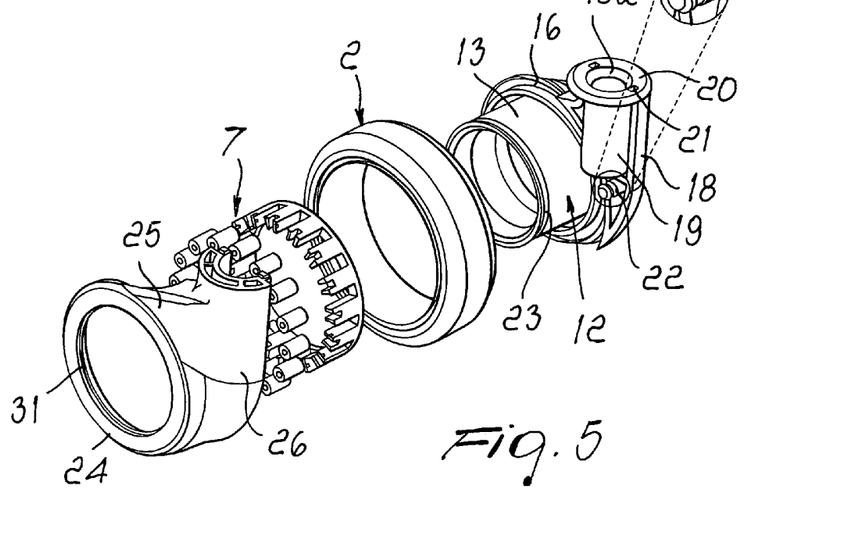
FIG. 5 is another exploded perspective view of the caster of FIG. 1, but from an opposite viewpoint with respect to FIG. 4.
Figures 6, 12, 18:
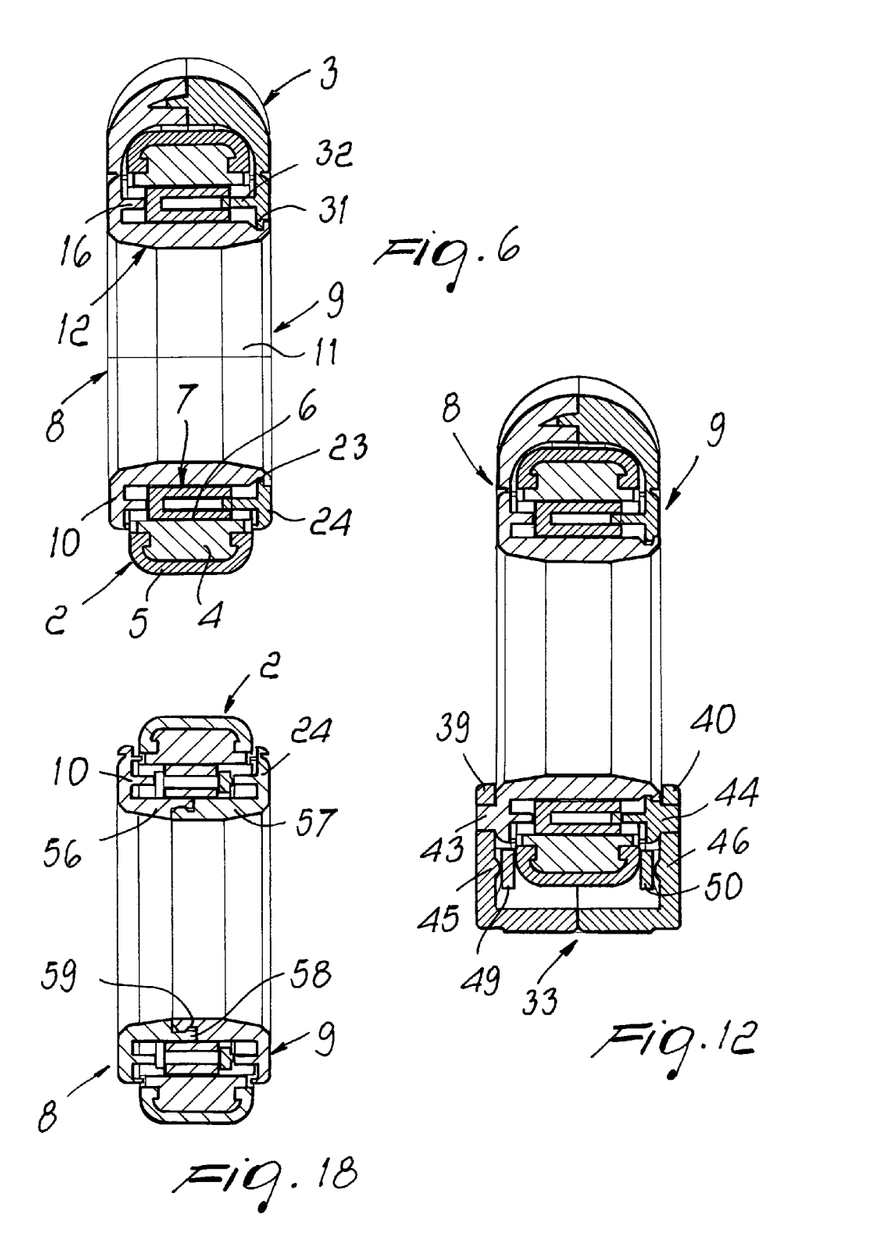
FIG. 6 is a sectional view, taken along the line VI-VI of FIG. 2.
FIG. 12 is a sectional view, taken along the line XII-XII of FIG. 7.
FIG. 18 is a sectional view of the caster of FIG. 17, taken along a vertical plane.
Figure 7:
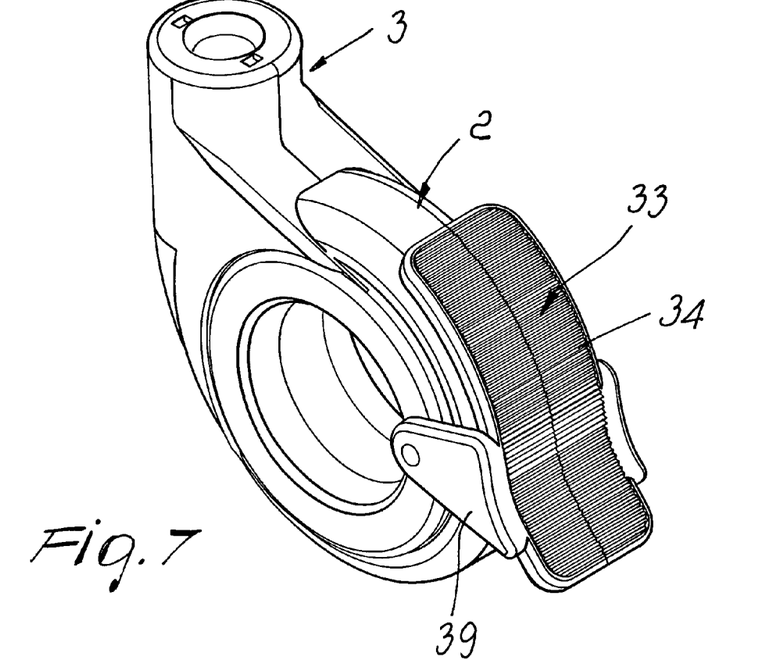
FIG. 7 is an exploded perspective view of a self-orienting caster according to a further exemplary embodiment of the invention.
Figure 8:
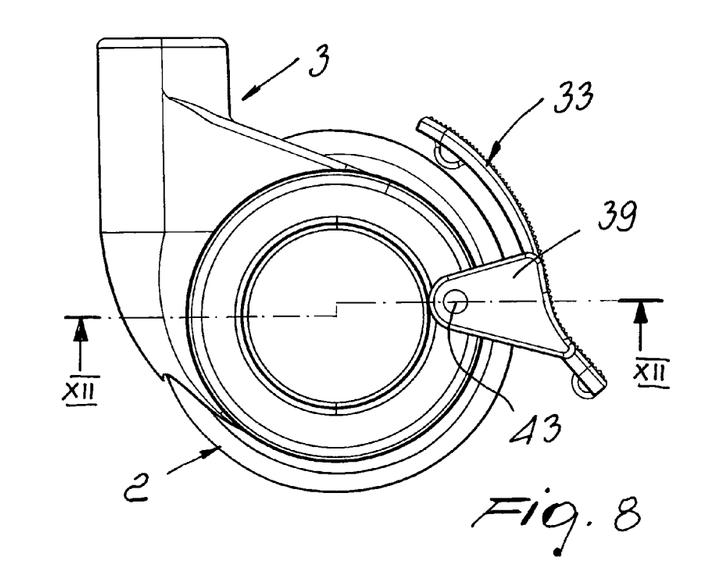
FIG. 8 is a side elevation view of the caster of FIG. 7.
Figure 9:
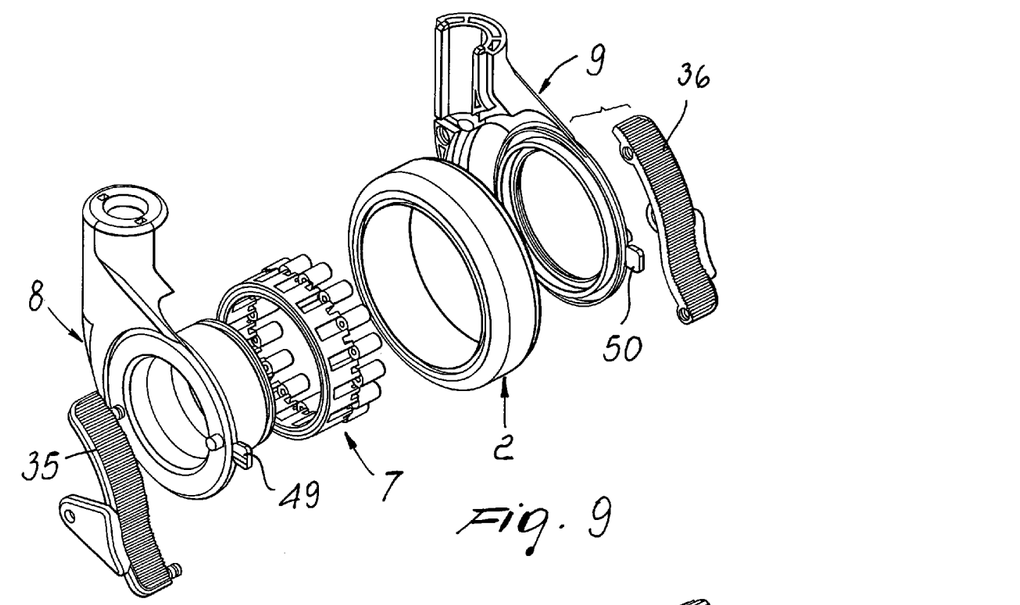
FIG. 9 is an exploded perspective view of the caster of FIG. 7.
Figure 10:
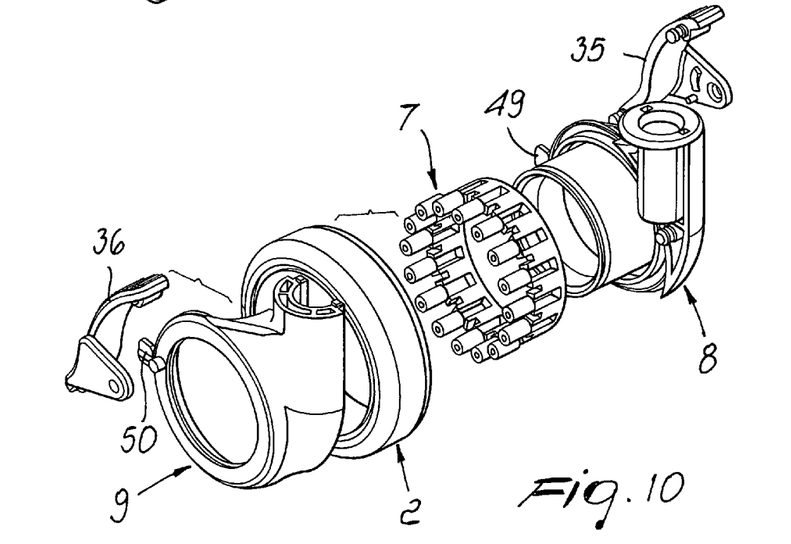
FIG. 10 is another exploded perspective view of the caster of FIG. 7, but from an opposite viewpoint with respect to FIG. 9.
Figure 17:
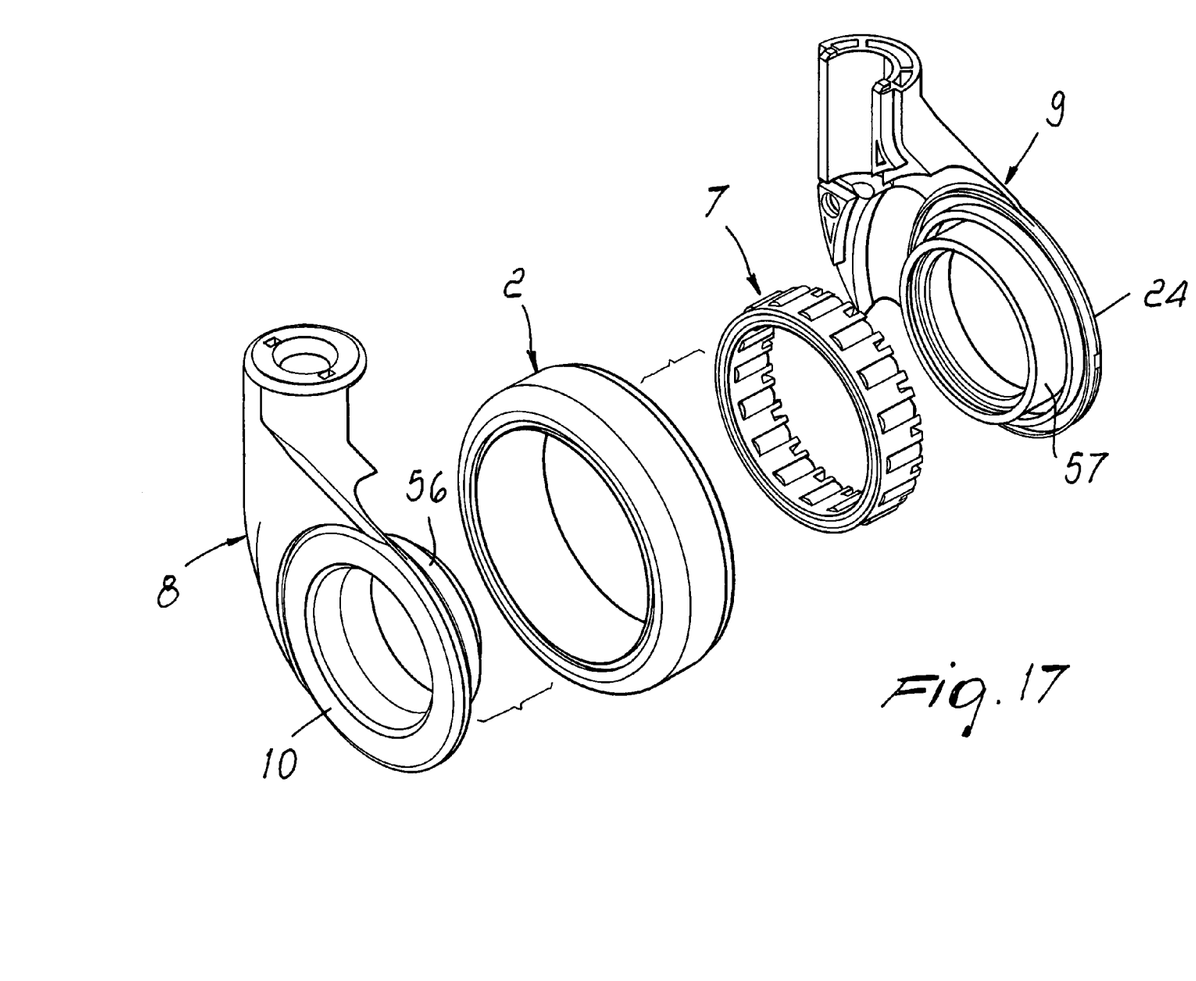
FIG. 17 is an exploded perspective view of a fourth embodiment.

In a fourth embodiment of the invention shown in FIGS. 17 and 18, respective tubular portions 56, 57 are monolithically rigidly coupled to the two flanges 10, 24, have an identical axial length and can be coupled at the front so as to provide an outer surface which constitutes the rolling track for the rolling elements 14 of the bearing 7.

The coupling of the portions 56, 57 is provided by providing at the ends of said portions an internal collar 58 and respectively an external groove 59, so that by forcing one into the other a firm mutual engagement of the portions 56, 57 and ultimately of the elements 8, 9 is produced.

Figure 19:
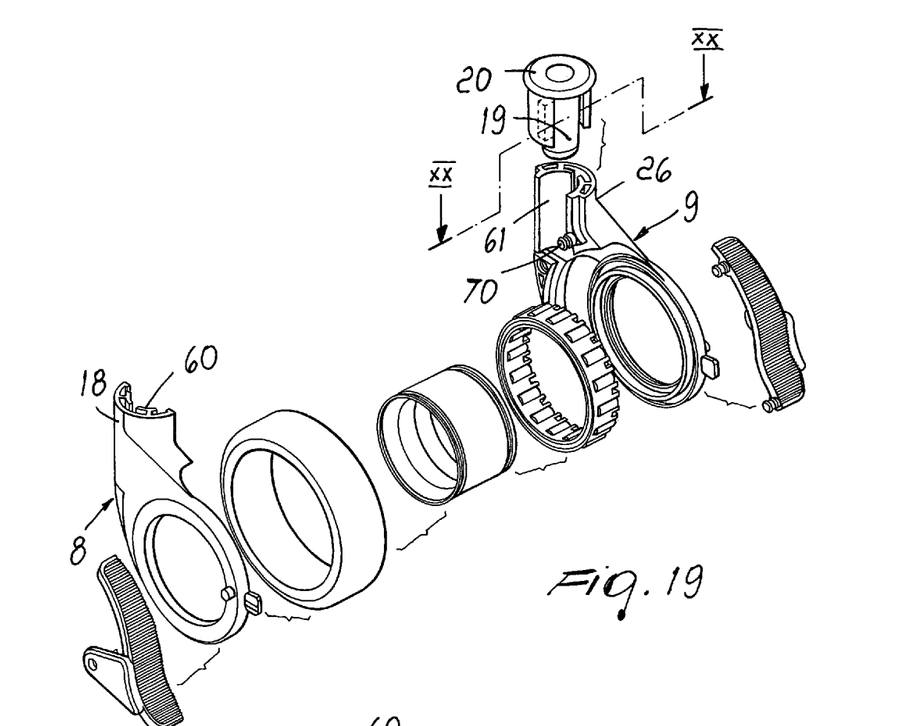
FIG. 19 is an exploded perspective view in a fifth embodiment.
Figure 20:
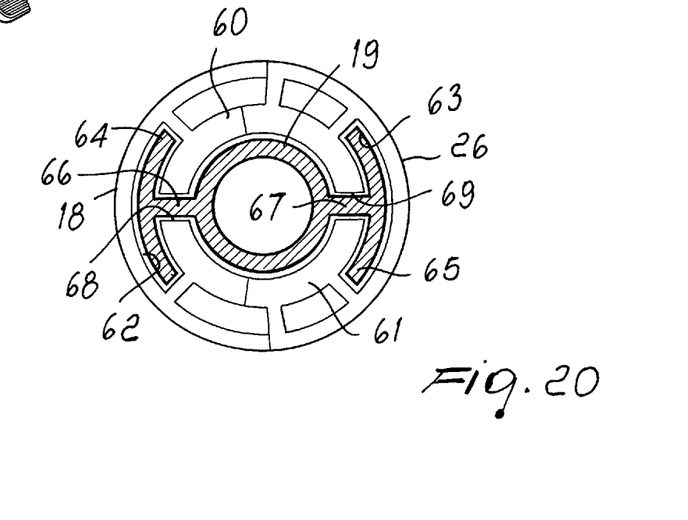
FIG. 20 is a sectional view, taken along the line XX-XX of FIG. 19.

FIGS. 19 and 20 relate to a fifth embodiment, in which the bush 19 and the corresponding collar 20, with respect to the casters of the previously described embodiments, form a separate component which is structured so as to be added to the supporting structure 3 after the elements 8, 9 have been coupled.

For this purpose, cylindrical sectors 60, 61 are provided within the half-cylinders 18, 26 and are joined coaxially to said half-cylinders by ridges so as to form two interspaces 62, 63.

Once the elements 8, 9 have been coupled to provide the supporting structure 3, the sectors 60, 61 form the seat for accommodating the bush 19.

The locking of the bush 19 in said seat is achieved by providing a pair of fins 64, 65 which extend axially from the collar 20 in diametrically opposite positions outside the bush 19. The fins 64, 65 are spaced from the bush and are joined to the latter by respective ridges 66, 67. In this manner, by inserting the bush 19 in the seat formed by the sectors 60, 61, the fins 64, 65 are inserted in the interspaces 62, 63 and the ridges 66, 67 are inserted in respective slots 68, 69 of the cylindrical sectors, until the collar 20 abuts against the top of the half-cylinders 18, 26. Accordingly, the bush 19 acts as a connecting element for the components of the supporting structure 3.

Conveniently, in order to better ensure the positioning and joining of the two elements 8, 9, there is an additional pivot 70 which protrudes from the element 9 and engages a mutually opposite hole of the other element 8.

If the elements 8, 9 are provided by die-casting metal (zinc-magnesium-aluminum alloy), the coupling pins 22 and 69 are knurled in order to ensure better retention in the respective holes.

Figure 21:
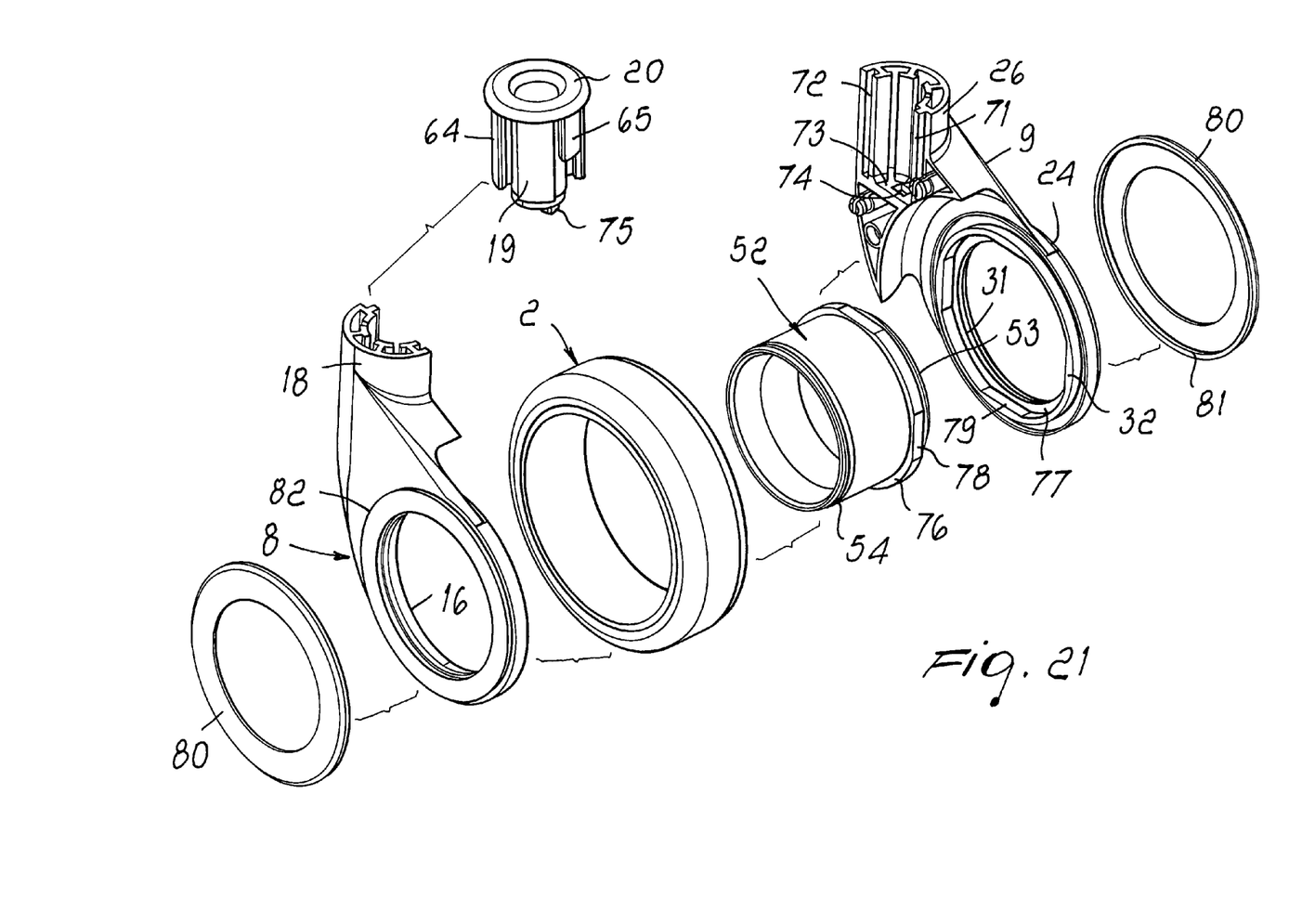
FIG. 21 is an exploded perspective view of a sixth embodiment.

FIG. 21 is a view of a sixth embodiment, which with respect to the embodiment of the preceding FIGS. 19 and 20 differs in that in order to ensure firm locking of the bush 19, the half-cylinders 18, 26 are provided with a larger number of cylindrical sectors 64, 65 and, on the mutually opposite edges, with a ridge 71 and a groove 72 which can be mutually coupled by interlocking. Further, in the bottom 73 of the cavities 27 which form the seat designed to accommodate the bush 19 there are openings 74 in which respective teeth 75 engage by interlocking and protrude below the bush 19 during the insertion of the latter.

FIG. 21 also illustrates an advantageous embodiment which relates to the sleeve 52 which, with respect to the sleeve of the embodiment shown in FIG. 16, has a collar 76 which is arranged proximate to the groove 53 and which, when the rim 31 of the flange 24 engages in the groove 53, is recessed within the annular cavity 77 which is surrounded by the ridge 32 of the flange 24. The collar 76 and the ridge 32 are provided with bevels 78, 79, which mutually cooperate so as to provide a prism-like coupling which prevents the sleeve from rotating so as to be anchored to the flange 24 both axially and rotationally.

The caster according to the invention is also suitable for modifications of an aesthetic nature, for example for the application of decorative elements which are capable of favoring the choice of the caster as a function of the piece of furniture onto which it is to be fitted.

In the embodiment of FIG. 21 there are annular studs 80 which are provided with a perimetric inner lip 81, which is contoured so as to engage an annular protrusion 82 formed on the outer face of the flanges 10, 24 of the elements 8, 9. The annular studs 80 can be made of any material (metal or plastics), in various colors so as to provide a border which highlights the tubular appearance of the caster.

In the practical embodiment of the invention, the shapes and dimensions may be any according to requirements. Advantageously, if the elements 8, 9 are made of metal, the pins 22 are provided with knurled portions in order to ensure firmer retention in the holes 29 in which they are inserted.

The disclosures in Italian Patent Application No. B02006A000638 from which this application claims priority are incorporated herein by reference.

What is claimed is:

1. A self-orienting caster for pieces of furniture, comprising at least one wheel which is supported so that it can rotate about a horizontal axis by a supporting structure which has a vertical cylindrical recess which is open upward and is axially offset with respect to said horizontal axis and constitutes a seat in which a pivot for the pivoting of the caster can rotate, said pivot being insertable in a receptacle of the piece of furniture onto which the caster is to be fitted, said supporting structure comprising two mutually opposite annular flanges, which form respective circular holes that are coaxial to said horizontal axis, the caster further comprising a tubular body coaxial to said circular holes and to said horizontal axis and having opposite ends which are rigidly coupled to inner edges of said holes, said tubular body forming externally, between said flanges, a rolling track for a supporting bearing on which said at least one wheel is rotatably supported, respective extensions being monolithically rigidly coupled to said flanges and comprising respective wings that protrude from said flanges and that are mutually associable so as to provide a closed supporting structure that forms said seat which is designed to receive said pivot for the pivoting of the wheel.

2. The caster according to claim 1, wherein said tubular body has an end which is monolithically rigidly coupled to the rim of a flange and an opposite end which is provided with an annular groove for the interlocking engagement of the inner rim of the other flange.

3. The caster according to claim 1, wherein said tubular body has opposite ends provided with annular grooves for the interlocking engagement of the inner rim of said flanges.

4. The caster according to claim 3, wherein respective tubular portions are monolithically rigidly coupled to said flanges and have substantially the same axial length and are coupled at the front so as to provide an outer surface which forms said rolling track for said bearing.

5. The caster according to claim 4, wherein the ends of said tubular portions are provided with an inner collar and respectively with an outer groove, so that by forcing one into the other a firm axial engagement is produced.

6. The caster according to claim 1, wherein said flanges have, on mutually opposite faces thereof, respective annular ridges which are coaxial to said tubular body and are suitable to keep said bearing centered on said tubular body.

7. The caster according to claim 6, wherein at least one of said ridges forms a seat which is adapted to receive a respective end of said tubular body so as to provide a side-fit coupling with the latter.

8. The caster according to claim 7, wherein said end of said tubular body has a collar which has external bevels and is adapted to engage in an annular cavity which is complementary to said collar so as to provide a side-fit coupling with said tubular body.

9. The caster according to claim 8, wherein the rim of said bush is constituted by a collar in which, in diametrically opposite positions, there are openings which are adapted to receive by interlocking respective teeth which are provided on the rim of the other half-cylinder.

10. The caster according to claim 9, wherein within said half-cylinders there are cylindrical sectors which form a receptacle for accommodating said bush and, together with said half-cylinders, a plurality of interspaces.

11. The caster according to claim 10, wherein fins protrude from the collar of said bush and are adapted to engage in said interspaces when said bush is arranged within said seat.

12. The caster according to claim 11, wherein said fins are joined to said bushes by ridges which are adapted to engage in respective slots of said cylindrical sectors when said bush is inserted within its receptacle.

13. The caster according to claim 12, wherein said bush is provided with teeth which are adapted to engage in openings which are provided in the bottom of the seat which is formed by said half-cylinders in which said bush is accommodated.

14. The caster according to claim 1, wherein said extensions form respective half-cylinders which are mutually integrated so as to surround a bush which is rigidly coupled to a half-cylinder and forms said seat designed to receive said pivot for the pivoting of the wheel.

15. The caster according to claim 1, comprising means for locking the wheel.

16. The caster according to claim 15, wherein said locking means comprise a lever which is provided with two arms which are articulated laterally to said flanges and are provided with protrusions which form cams which are functionally associated with braking pads which are fixed elastically to said flanges.

17. The caster according to claim 16, wherein said cams are constituted by ramps which are concentric with respect to the articulation axis of said lever and in that said braking pads are fixed elastically to the rim of said flanges.

18. The caster according to claim 17, wherein said lever is constituted by two parts which are mirror-symmetrically identical and are mutually associated by interlocking connecting means.

19. The caster according to claim 1, wherein said flanges are provided with means for the anchoring of studs which are coaxial to said tubular body.

20. The caster according to claim 19, wherein said studs are provided with an internal lip, which is adapted to mate by interlocking on a protrusion which is formed on said flanges coaxially to said tubular body.

21. The caster according to claim 1, wherein said supporting structure is constituted by two elements, one of said elements being provided with pins which are adapted to engage in respective holes of the other element.

22. A self-orienting caster for pieces of furniture, comprising at least one wheel which is supported so that it can rotate about a horizontal axis by a supporting structure which has a vertical cylindrical recess which is open upward and is axially offset with respect to said horizontal axis and constitutes a seat in which a pivot for the pivoting of the caster can rotate, said pivot being insertable in a receptacle of the piece of furniture onto which the caster is to be fitted, said supporting structure comprising two mutually opposite annular flanges, which form respective circular and coaxial holes, the caster further comprising a tubular body having opposite ends which are rigidly coupled to inner edges of said holes and form externally, between said flanges, a rolling track for a supporting bearing for said wheel, respective extensions being monolithically rigidly coupled to said flanges and being mutually associable so as to form said seat which is designed to receive said pivot for the pivoting of the wheel, and wherein said flanges have, on mutually opposite faces thereof, respective annular ridges which are coaxial to said tubular body and are suitable to keep said bearing centered on said tubular body, at least one of said ridges forming a seat which is adapted to receive a respective end of said tubular body so as to provide a side-fit coupling with the latter.

23. A self-orienting caster for pieces of furniture, comprising at least one wheel which is supported so that it can rotate about a horizontal axis by a supporting structure which has a vertical cylindrical recess which is open upward and is axially offset with respect to said horizontal axis and constitutes a seat in which a pivot for the pivoting of the caster can rotate, said pivot being insertable in a receptacle of the piece of furniture onto which the caster is to be fitted, said supporting structure comprising two mutually opposite annular flanges, which form respective circular and coaxial holes, the caster further comprising a tubular body having opposite ends which are rigidly coupled to inner edges of said holes and form externally, between said flanges, a rolling track for a supporting bearing for said wheel, respective extensions being monolithically rigidly coupled to said flanges and being mutually associable so as to form said seat which is designed to receive said pivot for the pivoting of the wheel, and wherein said extensions form respective half-cylinders which are mutually integrated so as to surround a bush which is rigidly coupled to a half-cylinder and forms said seat designed to receive said pivot for the pivoting of the wheel.

\* \* \* \* \*